US009105192B2

(12) United States Patent
Cund et al.

(10) Patent No.: US 9,105,192 B2
(45) Date of Patent: Aug. 11, 2015

(54) MONITORING APPARATUS AND METHOD

(75) Inventors: Mark Cund, Warwickshire (GB); Simon Peter Gilling, Coventry (GB); Paul Widdowson, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/116,179

(22) PCT Filed: May 10, 2012

(86) PCT No.: PCT/EP2012/058701
§ 371 (c)(1),
(2), (4) Date: Feb. 28, 2014

(87) PCT Pub. No.: WO2012/152896
PCT Pub. Date: Nov. 15, 2012

(65) Prior Publication Data
US 2014/0195132 A1    Jul. 10, 2014

(30) Foreign Application Priority Data

May 12, 2011 (GB) .................................. 1107921.7

(51) Int. Cl.
*G01S 13/93* (2006.01)
*G08G 1/16* (2006.01)
(Continued)

(52) U.S. Cl.
CPC . *G08G 1/166* (2013.01); *B60T 7/22* (2013.01); *G01S 13/58* (2013.01); *G01S 13/931* (2013.01); *G01S 15/58* (2013.01); *G01S 15/931* (2013.01); *B60W 30/09* (2013.01);
(Continued)

(58) Field of Classification Search
CPC ....... G01S 13/58; G01S 13/931; G01S 15/58; G01S 15/931; G01S 2013/9346; B60W 30/09; B60W 2550/306; B60W 2710/18; B60T 7/22; G08G 1/166
See application file for complete search history.

(56) References Cited

U.S. PATENT DOCUMENTS 5,699,040 A    12/1997 Matsuda
5,754,099 A *  5/1998 Nishimura et al. ........... 340/435
(Continued)

FOREIGN PATENT DOCUMENTS

EP    1065520 A2    1/2001
EP    2085279 A1    8/2008
(Continued)

OTHER PUBLICATIONS

International Search Report for International Application No. PCT/EP2012/058701 dated Aug. 23, 2012.
(Continued)

*Primary Examiner* — Michael J Zanelli
(74) *Attorney, Agent, or Firm* — Carlson, Gaskey & Olds

(57) ABSTRACT

Embodiments of the invention provide an apparatus for monitoring one or more target objects in an environment external to a host vehicle by means of at least one sensor. The apparatus is arranged to trigger at least one action responsive to detection by means of the at least one sensor of prescribed relative movement between the host vehicle and the one or more target objects. The apparatus is arranged to determine a lateral offset value being a distance of the or each target object from an extended axis of the host vehicle and to over-ride triggering of the at least one action such that triggering of the at least one action is not performed in dependence on the lateral offset value.

18 Claims, 2 Drawing Sheets

(51) Int. Cl.
*G01S 13/58* (2006.01)
*G01S 15/58* (2006.01)
*G01S 15/93* (2006.01)
*B60T 7/22* (2006.01)
*B60W 30/09* (2012.01)

(52) U.S. Cl.
CPC ..... *B60W 2550/306* (2013.01); *B60W 2710/18* (2013.01); *G01S 2013/9346* (2013.01)

(56) References Cited

U.S. PATENT DOCUMENTS

| | | | |
|---|---|---|---|
| 5,995,037 A * | 11/1999 | Matsuda et al. | 342/71 |
| 6,675,094 B2 * | 1/2004 | Russell et al. | 701/301 |
| 7,026,976 B1 | 4/2006 | Higashida | |
| 2003/0106732 A1 | 6/2003 | Watanabe et al. | |
| 2004/0193351 A1 * | 9/2004 | Takahashi et al. | 701/70 |
| 2009/0015462 A1 * | 1/2009 | Nakanishi | 342/107 |
| 2009/0192710 A1 * | 7/2009 | Eidehall et al. | 701/301 |

FOREIGN PATENT DOCUMENTS

| | | |
|---|---|---|
| JP | 2005028992 A | 2/2005 |
| JP | 2009230464 A | 10/2009 |

OTHER PUBLICATIONS

Patent Office of the People's Republic of China, Search Report for Patent Application No. 201280022972.X dated Aug. 27, 2014.

* cited by examiner

MONITORING APPARATUS AND METHOD

CROSS REFERENCE TO RELATED APPLICATIONS

This application claims priority from UK Patent Application No. 1107921.7 filed 12 May 2011, the entire contents of which are expressly incorporated by reference herein.

TECHNICAL FIELD

The present invention relates to apparatus and a method for monitoring a target object external to a vehicle.

BACKGROUND

It is known to provide a vehicle having apparatus arranged to identify target objects in front of or behind the vehicle and to activate automatically a braking system of the vehicle if the vehicle determines that collision with the object is imminent.

Such systems typically employ radar or ultrasonic transmitter/receiver modules to detect target objects. The well known Doppler effect is used to determine a range and rate of change of range (or 'range rate') of the object from the vehicle.

It is desirable to provide improved apparatus to increase the likelihood that the apparatus will correctly identify a target object that represents a collision risk to the vehicle and take appropriate action in a given situation.

SUMMARY

Embodiments of the invention may be understood with reference to the appended claims. Embodiments of the invention provide an apparatus, a vehicle and a method.

In one aspect of the present invention for which protection is sought there is provided a monitoring apparatus for monitoring one or more target objects in an environment external to a host vehicle by means of at least one sensor, the apparatus being arranged to monitor a speed of the host vehicle and relative movement between the host vehicle and the one or more target objects, the apparatus being arranged to trigger at least one action responsive to the speed of the host vehicle and detection of predetermined relative movement between the host vehicle and the one or more target objects thereby to reduce a risk of collision of the host vehicle with the one or more target objects, the apparatus being further arranged to determine a lateral offset of each said one or more target objects from an extended axis of the host vehicle, being a lateral distance of each said one or more target objects from the extended axis, wherein if the lateral offset exceeds a prescribed lateral offset value the host vehicle is arranged to over-ride triggering of the at least one action whereby triggering of the at least one action is not performed.

In a further aspect of the invention for which protection is sought there is provided an apparatus for monitoring one or more target objects in an environment external to a host vehicle by means of at least one sensor; the apparatus being arranged to trigger at least one action responsive to detection by means of the at least one sensor of prescribed relative movement between the host vehicle and the one or more target objects; wherein the apparatus is arranged to determine a lateral offset value being a distance of the or each target object from an extended axis of the host vehicle and to over-ride triggering of the at least one action such that triggering of the at least one action is not performed in dependence on the lateral offset value.

The apparatus may take the form of a system, such as a monitoring system. Embodiments of the invention have the advantage that the at least one action cannot be triggered if the lateral offset of the one or more target objects exceeds the prescribed lateral offset value.

This feature reduces a risk that the at least one action is performed when the target object is not within the actual path of the host vehicle.

The apparatus may be arranged to trigger the at least one action responsive to the detection of prescribed relative movement between the host vehicle and the one or more target objects in further dependence on the speed of the host vehicle.

The apparatus may be arranged to determine the lateral offset value of the or each target object by means of the at least one sensor.

The apparatus may be arranged to determine the lateral offset value of the at least one target object by reference to a distance of the at least one target object from the host vehicle and an angle between a vector from the host vehicle to the at least one target object and the extended axis.

Optionally the extended axis of the vehicle corresponds to an extended longitudinal axis of the vehicle.

Further optionally the apparatus is arranged to over-ride triggering of the at least one action in further dependence on a width of the at least one target object.

The apparatus may be arranged to determine a width of the at least one target object.

The apparatus may be arranged to measure an actual width of the at least one target object, optionally by means of the at least one sensor. Optionally the apparatus may be arranged to measure an actual width of the at least one target object in part by means of the at least one sensor.

Alternatively or in addition the apparatus may be arranged to determine the width of the at least one target object based on a stored value of target object width. Optionally the apparatus may be arranged to determine the width of the at least one target object based in part on a stored value of target object width.

Thus in some embodiments the apparatus may be arranged to assume that the width of each target object is a prescribed amount, such as 0.5 m, 1 m or any other suitable value.

The apparatus may be arranged to determine the width of the target object responsive to the detection of prescribed or predetermined relative movement between the host vehicle and target object.

Optionally the apparatus may be arranged to determine the width of the target object in part responsive to the detection of prescribed or predetermined relative movement between the host vehicle and target object.

For example, in some embodiments the apparatus may be arranged to distinguish between a motorcycle and a truck responsive to detection of prescribed or predetermined relative movement between the target object and host vehicle. The apparatus may then assume that a truck has a prescribed width of one value and that a motorcycle has a prescribed width of another value less than the width of a truck.

Optionally the apparatus is arranged to determine the width of the target object responsive to a characteristic signature of the target object measured by the apparatus.

Optionally the apparatus is arranged to determine the width of the target object in part responsive to a characteristic signature of the target object measured by the apparatus. Thus the apparatus may be arranged to analyse one or more characteristics of a signal generated by the apparatus and reflected from the target object such as a radar signal, an ultrasonic signal or any other suitable signal.

The apparatus may be arranged not to trigger the at least one action if the lateral offset of the at least one target object is determined to be a distance from the host vehicle axis greater than the prescribed lateral offset value plus a prescribed or predetermined proportion of the width of the at least one target object.

Optionally the prescribed or predetermined proportion corresponds to substantially half the width of the at least one target object.

Alternatively the prescribed lateral offset value may be a value corresponding to half of the width of the host vehicle.

Optionally the prescribed lateral offset value is a value greater than half of the width of the host vehicle.

Alternatively the prescribed lateral offset may be a value less than half of the width of the host vehicle.

Optionally the prescribed lateral offset value is a value responsive to one or more characteristics of relative movement between the host vehicle and the at least one target object. Thus in some embodiments, if relative movement meeting one or more prescribed or predetermined conditions is detected the lateral offset value may be set to one value whilst if relative movement meeting one or more other prescribed or predetermined conditions is met the lateral offset may be set to a different value.

Optionally the prescribed lateral offset value is a value responsive to a position of the at least one target object and one or more other objects identified by the apparatus relative to one another and/or the host vehicle.

Optionally the apparatus has or is provided in combination with range determination means operable to determine the range of the target object from the vehicle and the rate of change of the range.

Optionally the range determination means comprises a radar transmitter and a radar receiver, the apparatus being arranged to determine the range of the target object from the vehicle by means of a radar signal transmitted from the transmitter and received at the receiver following reflection by the target object.

Alternatively or in addition the range determination means comprises an ultrasonic transmitter and an ultrasonic receiver, the apparatus being arranged to determine the range of the target object from the vehicle by means of an ultrasonic signal transmitted from the transmitter and received at the receiver following reflection by the target object.

Optionally the at least one action comprises triggering pre-arming of one or more brakes of the vehicle. Pre-arming may be undertaken when a first prescribed relative movement is detected.

The at least one action may comprise triggering application of one or more brakes of the vehicle thereby to slow the vehicle. Triggering application of one or more brakes may be undertaken when a second prescribed relative movement is detected.

The first prescribed relative movement may be different from the second prescribed relative movement.

According to a further aspect of the invention there is provided a vehicle comprising an apparatus as described in any of the preceding paragraphs.

According to a still further aspect of the invention there is provided a method of monitoring one or more target objects in an environment external to a vehicle by means of at least one sensor, the method comprising monitoring a speed of the host vehicle and relative movement between the host vehicle and the one or more target objects, and triggering at least one action responsive to the speed of the host vehicle and detection of predetermined relative movement between the host vehicle and the one or more target objects thereby to reduce a risk of collision of the host vehicle with the one or more target objects, the method comprising determining a lateral offset of each said one or more target objects from an extended axis of the host vehicle being a lateral distance of each said one or more target objects from the extended axis of the host vehicle, and not triggering the at least one action if the lateral offset exceeds a prescribed value.

In one aspect of the invention there is provided a method of monitoring one or more target objects in an environment external to a vehicle by means of at least one sensor, the method comprising: monitoring relative movement between the host vehicle and the one or more target objects; triggering at least one action responsive to the detection of prescribed relative movement between the host vehicle and the one or more target objects; determining a value of a lateral offset of the or each target object from an extended axis of the host vehicle; and over-riding triggering of the at least one action such that triggering of the at least one action is not performed in dependence on the value of the lateral offset.

The method may comprise the step of triggering the at least one action responsive to the detection of prescribed relative movement between the host vehicle and the one or more target objects comprises triggering the at least one action in further dependence on the speed of the host vehicle.

The method may further comprise over-riding triggering of the at least one action if the lateral offset value exceeds a prescribed value.

The step of determining the lateral offset of the or each target object may comprise determining a lateral distance of the or each target object from the extended axis of the host vehicle.

The step of triggering the at least one action may comprise the step of triggering a brake pre-arming operation in which pre-arming of one or more brakes of the vehicle is performed responsive to the detection of first prescribed relative movement between the host vehicle and the one or more target objects.

Alternatively or in addition the step of triggering the at least one action comprises the step of triggering an operation in which application of one or more brakes of the vehicle takes place thereby to slow the vehicle responsive to the detection of second prescribed relative movement between the host vehicle and the one or more target objects.

According to another aspect of the invention there is provided monitoring apparatus for monitoring one or more target objects in an environment external to a host vehicle by means of at least one sensor, the apparatus being arranged to monitor a speed of the host vehicle and relative movement between the host vehicle and the one or more target objects, the apparatus being arranged to trigger at least one action responsive to the speed of the host vehicle and detection of predetermined relative movement between the host vehicle and the one or more target objects thereby to reduce a risk of collision of the host vehicle with the one or more target objects, the apparatus being further arranged to determine a lateral offset of each said one or more target objects from an extended axis of the host vehicle, being a lateral distance of each said one or more target objects from the extended axis, wherein if the lateral offset exceeds a prescribed lateral offset value the host vehicle is arranged not to trigger the at least one action.

Within the scope of this application it is envisaged that the various aspects, embodiments, examples, features and alternatives set out in the preceding paragraphs, in the claims and/or in the following description and drawings may be taken independently or in any combination. Features described with reference to one embodiment are applicable to all embodiments, unless there is incompatibility of features.

BRIEF DESCRIPTION OF THE DRAWINGS

At least one embodiment described below, by way of example only, with reference to the accompanying figures in which.

DETAILED DESCRIPTION

Figure 1:
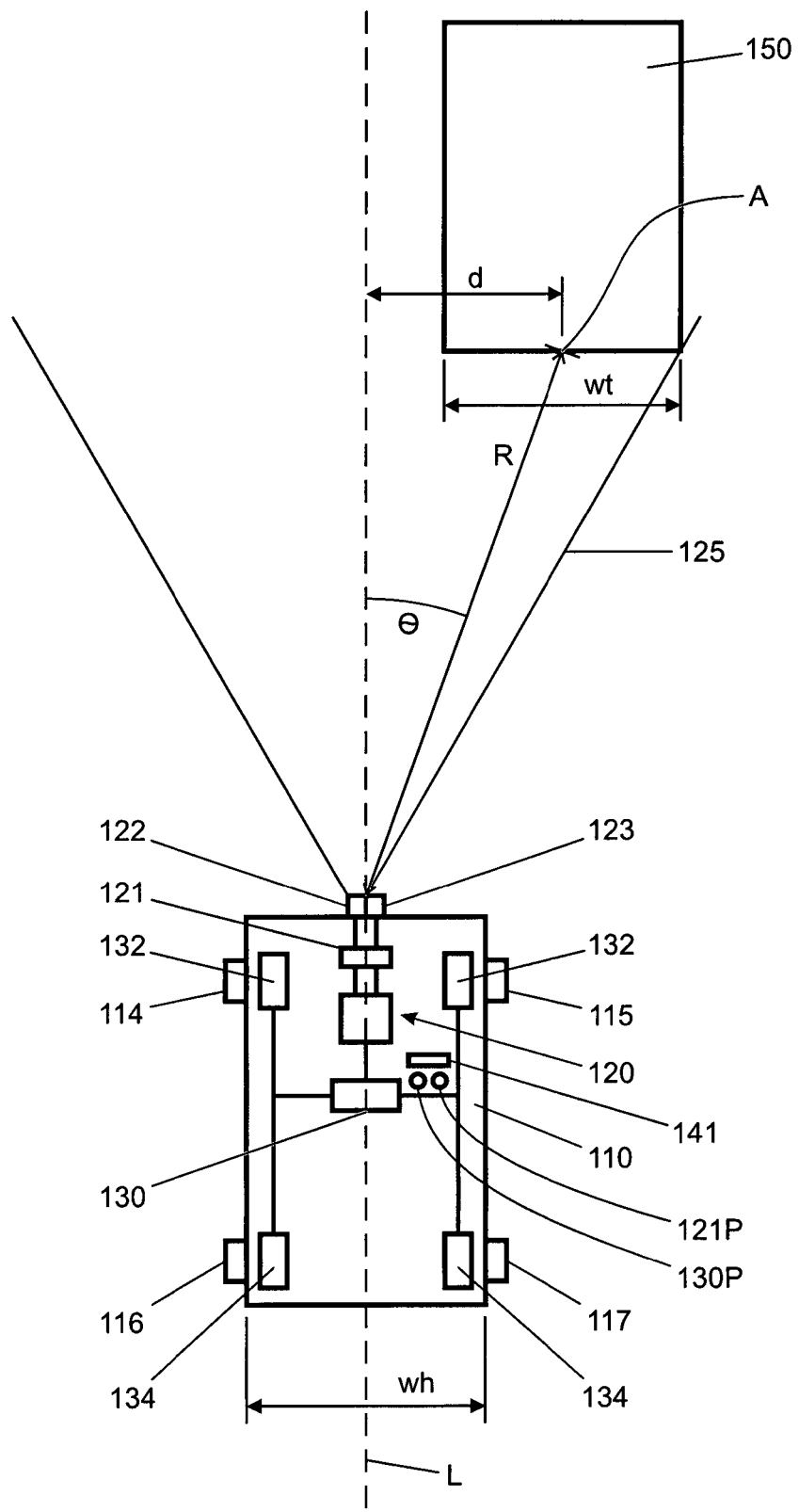
FIG. 1 is a schematic illustration of an apparatus according to an embodiment of the present invention installed in a motor vehicle.

In one embodiment of the invention monitoring apparatus 120 is provided in a host motor vehicle 110 as shown in FIG. 1. The monitoring apparatus 120 has a radar module 121 arranged to identify the presence of a target object ahead of the vehicle 110 such as a vehicle 150. The radar module 121 is arranged to determine the range R of the object 150 from the vehicle 110 and the rate of change of the range, R' (or 'range rate').

The monitoring apparatus 120 forms a core of an intelligent emergency braking system (IEB) of the vehicle. The apparatus 120 is operable to control a braking system of the vehicle to slow or stop the vehicle in the event that certain prescribed conditions are met. The apparatus 120 is therefore coupled to a brake controller 130 of the vehicle. The brake controller 130 is in turn arranged to control a braking system of the vehicle responsive to an input from the apparatus 120 or a driver-operated brake pedal 130P.

The braking system includes a pair of front brakes 132 and a pair of rear brakes 134. The front brakes 132 are arranged to apply a braking action to a pair of front wheels 114, 115 of the vehicle 110 whilst the rear brakes 134 are arranged to apply a braking action to a corresponding pair of rear wheels 116, 117 of the vehicle 110.

The brakes 132, 134 are brakes of the type having a brake pad and a brake disc, the brake disc being attached to the respective wheel. Braking action is obtained by urging the brake pad against the brake disc.

The brake controller 130 is operable to control the front brakes 132 and rear brakes 134 to execute a braking action by increasing a pressure of brake fluid in brake fluid lines of the vehicle 110.

It is to be understood that when a pressure of brake fluid in the braking system is increased initially, the brake pad of each brake 132, 134 moves into contact with the corresponding disc of the brake 132, 134. Initial, relatively light contact by the pad may be referred to as 'kissing' of the disc.

With further increasing brake fluid pressure the pads are urged against the discs with increasing force, causing the brakes 132, 134 to provide the required braking action.

The brake controller 130 is operable to increase the pressure of brake fluid in the brake lines sufficiently to cause the brake pad of each brake 132, 134 to move into contact with the corresponding disc of the brake 132, 134 but without causing noticeable braking action. This operation may be referred to as 'pre-arming' of the brakes, or a 'pre-arm operation'. Once in the 'pre-armed' state, braking action may be effected more rapidly by the braking system when the brake controller 130 subsequently begins to increase the pressure of brake fluid in the brake lines.

The monitoring apparatus 120 is operable to provide either a first or a second alert signal to the brake controller 130. If the first alert signal is provided, the brake controller 130 performs the pre-arm operation described above.

If the second alert signal is provided, the brake controller 130 is arranged to apply the brakes 132, 134 by increasing the brake pressure sufficiently to decelerate the vehicle 110.

The apparatus 120 is arranged to provide the first or second alert signals responsive to data in respect of the speed at which the host vehicle 110 is moving and detection of prescribed or predetermined relative movement between the target object 150 and host vehicle 110. In one embodiment data in respect of host vehicle speed may be obtained by reference to data transmitted on a controller area network (CAN) bus of the vehicle 110. In alternative embodiments the data may be obtained by a direct feed from another controller, via a dedicated speed sensor or by any other suitable means.

Other arrangements are also useful.

The radar module 121 of the apparatus 120 has a radar transmitter 122 and a radar receiver 123. In the embodiment of FIG. 1 the radar module 121 is a Delphi ESR (electronically scanning radar) module (Delphi, Troy, Mich.).

The radar module 121 is arranged to control the radar transmitter 122 to transmit a radar signal 125 ahead of the vehicle 110. The radar receiver 123 is arranged to detect portions of the radar signal 125 that are reflected back towards the vehicle 110 by objects ahead of the vehicle. The module 121 is configured to determine the range R of the objects ahead of the vehicle by measuring a phase difference between the radar signal 125 transmitted by the transmitter 122 and the signal received by the receiver 123. It is to be understood that in some embodiments a time of flight analysis of the reflected radar signal may be employed to determine the range of objects ahead of the vehicle.

The module 121 is further configured to determine the range rate R' of the objects based on a frequency of the radar signal detected by the receiver 123 relative to that of the radar signal transmitted by the transmitter 122. It is to be understood that the frequency will be different depending on the relative speeds of the vehicle 110 and objects detected by the module 121, a phenomenon known as the 'Doppler effect'.

In the embodiment of FIG. 1 the transmitter 122 and receiver 123 are provided in the form of a transmit/receive unit (TRU) 124. The TRU 124 is aligned with a longitudinal axis L of the vehicle 110 such that a field of view of the receiver 123 is substantially symmetrical about the axis L and the radar signal transmitted by the transmitter 122 is transmitted such that the beam irradiates a region ahead of the vehicle that is also substantially symmetrical about the axis L. Other arrangements are also useful.

In the arrangement of FIG. 1 the apparatus 120 is arranged to determine the position of a portion of a target object responsive to reflected radar signals. Signals of the highest intensity reflected from an object are identified by the apparatus 120 and used to determine the position of the target object relative to the host vehicle 110 and range R of the object from the host vehicle 110.

In determining the position of the target object the apparatus 120 determines an angle θ between a line from the TRU 124 to the location A of the target object for which a reflected signal has been received and a longitudinal axis L of the host vehicle 110. Based on the values of θ and R determined by the apparatus 120 the apparatus 120 determines a lateral offset d of the location A from the longitudinal axis L of the host vehicle 110.

The apparatus 120 is arranged to compare the measured value of lateral offset d with a known value of a width wh of the host vehicle 110. In the present embodiment, if the value of lateral offset d of the target object 150 is greater than half the width of the host vehicle 110 the apparatus 120 determines that the target object 150 is a target that is not permitted to trigger the first or second alert signals of the apparatus 120.

It is to be understood that in this embodiment the apparatus 120 does not take account of a width wt of the target object 150.

Thus, it is to be understood that in the present embodiment the apparatus 120 may over-ride issuance of the first and second alert signals to the brake controller 130 even when a portion of the target object 150 is situated in the path of the host vehicle 110.

However, it is to be understood that in some applications it may be more important that the apparatus 120 does not trigger automatic application of brakes 132, 134 when a risk of collision does not exist than that the apparatus fails to trigger automatic applications of brakes 132, 134 when a risk of collision does exist.

It is to be understood that some embodiments of the invention are arranged to increase or decrease the effective width we of a 'path' of the host vehicle 110 being a width of an area swept by the vehicle 110 as it moves. This 'effective path' may be described as a 'host funnel window' (HFW) since it represents a 'funnel region' or window that is monitored by the host vehicle 110. If a target object is not within the HFW, automatic actuation of the brakes 132, 134 responsive to a determination that a collision may be imminent is suppressed.

Figure 2:
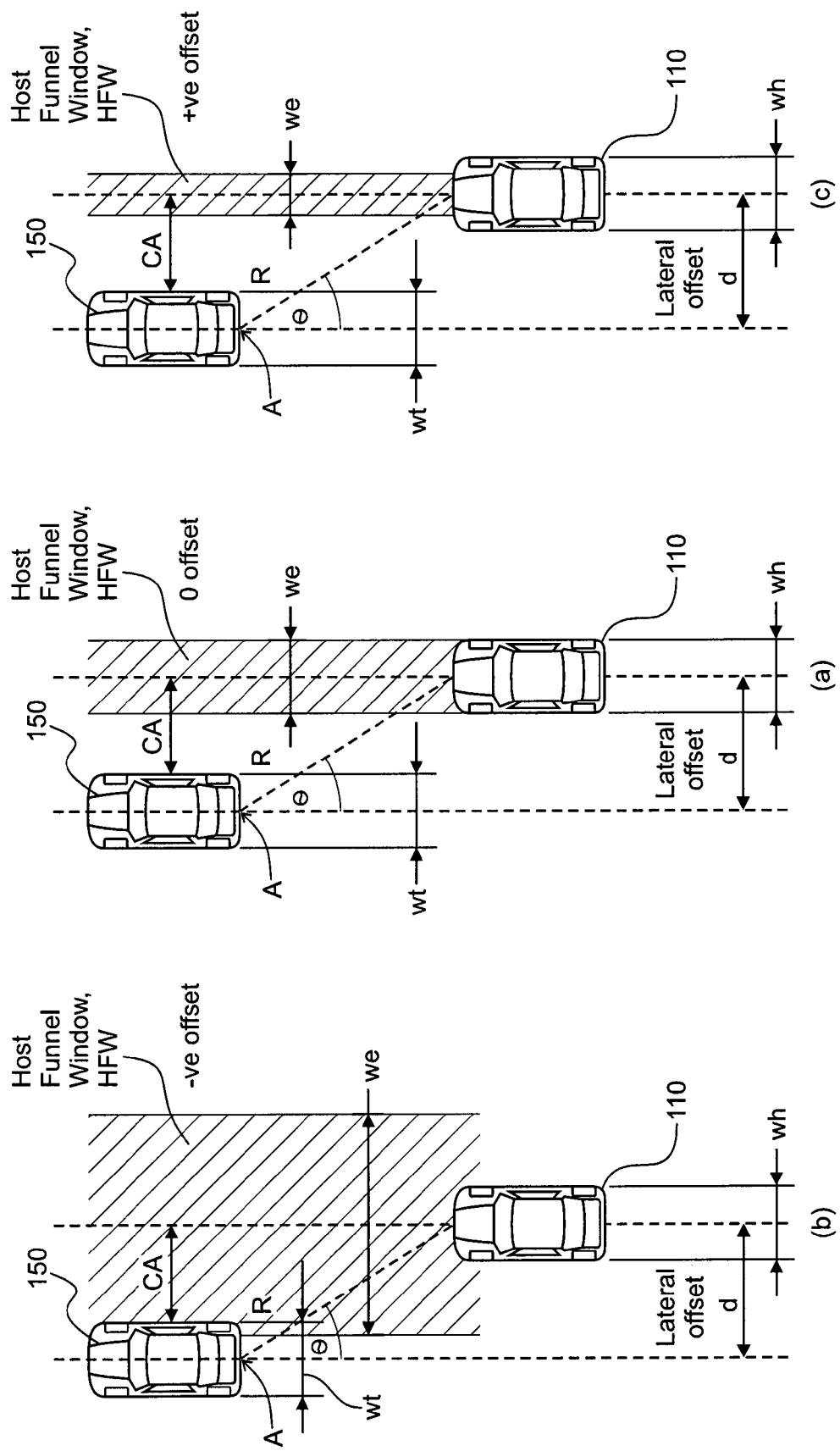
FIG. 2 is a schematic illustration of relative positions of a host vehicle and target object (being a vehicle in the situation illustrated) for different widths of host funnel window relative to a width of the host vehicle.

FIG. 2 illustrates embodiments of the invention in which (a) the effective width we of the path of the host vehicle 110 is equal to the actual width wh of the host vehicle 110, (b) the effective width we of the path of the host vehicle 110 is greater than the width wh of the host vehicle 110 and (c) the effective width we of the path of the vehicle is less than the width wh of the host vehicle 110.

In the case of FIG. 2(*b*), a 'negative offset' has been applied to the value wh of the width of the host vehicle 110 in order to calculate we, such that the effective width we of the host vehicle 110 is greater than the actual width wh. It is to be understood that if a sufficiently large negative offset is applied, the apparatus 120 may generate the first or second alert signals when the target object 150 does not lie in the actual path of the vehicle 110.

In the case of FIG. 2(*c*), a 'positive offset' has been applied to the value wh of the width of the host vehicle 110 such that the effective width we of the host vehicle 110 is less than the actual width wh. Thus, the apparatus 120 may suppress generation of the first or second alert signals when the target object 150 does in fact lie in the actual path P of the vehicle 110. This is because the actual width wh of the host vehicle 110 is wider than the effective width we in the arrangement of FIG. 2(*c*).

In some embodiments the apparatus 120 is arranged to calculate the width wt of the target object 150 and to determine whether the target object 150 lies in the actual path of the host vehicle 110. In some embodiments the apparatus 120 achieves this by assuming the location A of the target object as determined by the apparatus 120 corresponds to a 'centre' or centroid of the object (with respect to a substantially horizontal axis or a lateral axis of the object). The apparatus 120 then subtracts half of the width wt of the target object as determined by the apparatus 120 from the lateral offset d of the target object 150 determined by the apparatus 120.

Subtraction in this manner results in a modified value of target offset. The modified value corresponds to a distance of closest approach CA of a side of the target object closest to the longitudinal axis L of the vehicle 110 with the axis L. If the distance of closest approach CA falls within the HFW the apparatus 120 may be arranged to allow automatic emergency braking to take place responsive to the speed of the host vehicle 110 and detection of prescribed or predetermined relative movement between the host vehicle 110 and the one or more target objects 150 as discussed above.

In some embodiments the width we of the HFW may be arranged to change responsive to one or more conditions. For example, the value of we may be arranged to be responsive to prescribed or predetermined movement of one or more target objects 150, a distribution of a plurality of target objects 150 and/or other objects with respect to the host vehicle 110 such as a density and/or spatial distribution of target objects and/or other objects or any other suitable condition or conditions.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for monitoring one or more target objects in an environment external to a host vehicle, comprising:
   at least one sensor comprising a radar transmitter and a radar receiver; and
   a monitoring apparatus being arranged to trigger at least one action responsive to detection of prescribed relative movement between the host vehicle and the one or more target objects;
   wherein the monitoring apparatus is arranged to determine a lateral offset value being a distance of the or each target object from an extended axis of the host vehicle and to over-ride triggering of the at least one action such that triggering of the at least one action is not performed in dependence on the lateral offset value; and
   wherein the monitoring apparatus is arranged to determine the lateral offset value of the or each target object in dependence on an output of the at least one sensor.

2. An apparatus as claimed in claim 1, wherein the monitoring apparatus is arranged to trigger the at least one action responsive to the detection of prescribed relative movement between the host vehicle and the one or more target objects based on the speed of the host vehicle.

3. An apparatus as claimed in claim 1, wherein the monitoring apparatus is arranged to determine the lateral offset value of the at least one target object by reference to a distance of the at least one target object from the host vehicle and an angle between a vector from the host vehicle to the at least one target object and the extended axis.

4. An apparatus as claimed in claim 1, wherein the extended axis of the vehicle corresponds to an extended longitudinal axis of the vehicle.

5. An apparatus as claimed in claim 1, wherein the monitoring apparatus is arranged to over-ride triggering of the at least one action based on a width of the at least one target object.

6. An apparatus as claimed in claim 5 wherein the monitoring apparatus is arranged not to trigger the at least one action if the lateral offset value of the at least one target object is determined to be a distance from the host vehicle axis greater than a prescribed lateral offset value plus a prescribed proportion of the width of the at least one target object.

7. An apparatus as claimed in claim 6 wherein the apparatus is arranged not to trigger the at least one action if the lateral offset value of the at least one target object is determined to be a distance from the host vehicle axis greater than a prescribed lateral offset value, wherein the prescribed lateral offset value is a value corresponding to any one of;
   half of the width of the host vehicle;
   a value greater than half of the width of the host vehicle;
   a value less than half of the width of the host vehicle;
   a value based on the detection of prescribed or predetermined relative movement between the host vehicle and the at least one target object; and
   a value responsive to a position of the at least one target object and one or more other objects identified by the monitoring apparatus relative to one another and/or the host vehicle.

8. An apparatus as claimed in claim 1 comprising range determination means operable to determine the range of the target object from the vehicle and a rate of change of the range.

9. An apparatus as claimed in claim 8 wherein the range determination means comprises the radar transmitter and the radar receiver, the monitoring apparatus being arranged to determine the range of the target object from the vehicle based on a radar signal transmitted from the transmitter and received at the receiver following reflection by the target object; or
   the range determination means comprises an ultrasonic transmitter and an ultrasonic receiver, the monitoring apparatus being arranged to determine the range of the target object from the vehicle based on an ultrasonic signal transmitted from the transmitter and received at the receiver following reflection by the target object.

10. An apparatus as claimed in claim 1, wherein the at least one action comprises triggering pre-arming of one or more brakes of the vehicle when a first prescribed relative movement is detected.

11. An apparatus as claimed in claim 1, wherein the at least one action comprises triggering application of one or more brakes of the vehicle thereby to slow the vehicle when a second prescribed relative movement is detected.

12. A vehicle comprising an apparatus for monitoring one or more target objects in an environment external to the host vehicle, comprising:
   at least one sensor comprising a radar transmitter and a radar receiver; and
   a monitoring apparatus being arranged to trigger least one action responsive to detection of prescribed relative movement between the host vehicle and the one or more target objects;
   wherein the monitoring apparatus is arranged to determine a lateral offset value being a distance of the or each target object from an extended axis of the host vehicle and to selectively over-ride triggering of the at least one action such that triggering of the at least one action is not performed based on the lateral offset value; and
   wherein the monitoring apparatus is arranged to determine the lateral offset value of the or each target object in dependence on an output of the at least one sensor.

13. A method of monitoring one or more target objects in an environment external to a vehicle by means of at least one sensor comprising a radar transmitter and a radar receiver, the method comprising: monitoring relative movement between the host vehicle and the one or more target objects;
   triggering at least one action based on detection of prescribed relative movement between the host vehicle and the one or more target objects;
   determining a value of a lateral offset of the or each target object from an extended axis of the host vehicle based on the output of the at least one sensor; and
   selectively over-riding triggering of the at least one action such that triggering of the at least one action is not performed based on the value of the lateral offset.

14. A method as claimed in claim 13 wherein the step of triggering the at least one action based on the detection of prescribed relative movement between the host vehicle and the one or more target objects comprises triggering the at least one action based on the speed of the host vehicle.

15. A method as claimed in claim 13 comprising over-riding triggering of the at least one action if the lateral offset value exceeds a prescribed value.

16. A method as claimed in claim 13, wherein determining the lateral offset of the or each target object comprises determining a lateral distance of the or each target object from the extended axis of the host vehicle.

17. A method as claimed in claim 13, wherein the step of triggering the at least one action comprises the step of triggering a brake pre-arming operation in which pre-arming of one or more brakes of the vehicle is performed responsive to the detection of a first prescribed relative movement between the host vehicle and the one or more target objects.

18. A method as claimed in claim 13, wherein the step of triggering the at least one action comprises the step of triggering a braking operation in which application of one or more brakes of the vehicle takes place thereby to slow the vehicle based on detection of a second prescribed relative movement between the host vehicle and the one or more target objects.

* * * * *

UNITED STATES PATENT AND TRADEMARK OFFICE
CERTIFICATE OF CORRECTION

| | | |
|---|---|---|
| PATENT NO. | : 9,105,192 B2 | Page 1 of 1 |
| APPLICATION NO. | : 14/116179 | |
| DATED | : August 11, 2015 | |
| INVENTOR(S) | : Mark Cund | |

It is certified that error appears in the above-identified patent and that said Letters Patent is hereby corrected as shown below:

IN THE CLAIMS:

In claim 12, column 10, line 1; after "trigger" insert --at--

Signed and Sealed this
Ninth Day of February, 2016

Michelle K. Lee
*Director of the United States Patent and Trademark Office*